US012291020B2

(12) United States Patent
Nishida

(10) Patent No.: US 12,291,020 B2
(45) Date of Patent: May 6, 2025

(54) PRINTER

(71) Applicant: SCREEN HOLDINGS CO., LTD., Kyoto (JP)

(72) Inventor: Yoshihiro Nishida, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 113 days.

(21) Appl. No.: 18/359,253

(22) Filed: Jul. 26, 2023

(65) Prior Publication Data

US 2024/0083181 A1 Mar. 14, 2024

(30) Foreign Application Priority Data

Sep. 14, 2022 (JP) ................................ 2022-146211

(51) Int. Cl.
*B41J 11/00* (2006.01)
*B41J 29/377* (2006.01)

(52) U.S. Cl.
CPC .......... *B41J 11/002* (2013.01); *B41J 29/377* (2013.01)

(58) Field of Classification Search
CPC .... B41J 11/002; B41J 29/377; B41J 11/0022; B41J 11/0024; B41J 15/04
See application file for complete search history.

(56) References Cited

U.S. PATENT DOCUMENTS

2007/0172285 A1* 7/2007 Izawa .................... B41J 11/002 101/424.1
2018/0370254 A1 12/2018 Nakamoto et al.

FOREIGN PATENT DOCUMENTS

JP 2019-005716 A 1/2019

* cited by examiner

*Primary Examiner* — Bradley W Thies
(74) *Attorney, Agent, or Firm* — Rimon P.C.

(57) ABSTRACT

Techniques are provided for adequately cooling a continuous base material while efficiently drying a pre-processing liquid on the continuous base material before printing using second ink. The printer includes first and second printing units and a dryer located downstream of the first printing unit and including a heating roller. The second printing unit is located downstream of the dryer. The heating roller has a first outer peripheral surface around which the continuous base material is wound, and heats the continuous base material with the first outer peripheral surface being in contact with a second surface of the continuous base material on the side opposite to the first surface. The dryer includes a cooling roller located downstream of the heating roller and having a second outer peripheral surface around which the continuous base material is wound. The second outer peripheral surface has a lower temperature than the first outer peripheral surface.

9 Claims, 8 Drawing Sheets

PRINTER

RELATED APPLICATION

This application claims the benefit of Japanese Application No. 2022-146211, filed on Sep. 14, 2022, the disclosure of which is incorporated by reference herein.

BACKGROUND OF THE INVENTION

Field of the Invention

The subject matter disclosed in the specification of the present application relates to a printer.

Description of the Background Art

Printers have conventionally been known that perform inkjet printing on the surface of a long band-like continuous base material such as a film while transporting the continuous base material by a roll-to-roll mechanism. For example, Japanese Patent Application Laid-Open No. 2019-005716 describes a technique for applying an anchor coat to a plastic film fed out from a feed roll, drying the anchor coat by a dryer, and then performing multi-color printing on a layer of the anchor coat. The dryer includes a plurality of heating guide rollers for heating the film by contact with the rear surface of the film, and a plurality of cooling guide rollers for cooling the film by contact with the rear surface of the film.

SUMMARY OF THE INVENTION

Technical Problem

According to the above conventional technique, however, the heating guide rollers and the cooling guide rollers are in point contact with the plastic film during transport when viewed in section. In this case, the heating guide rollers have low heat control efficiency and therefore it is difficult to efficiently heat the plastic film. The cooling guide rollers also have low heat control efficiency, and if the cooling guide rollers fail to adequately cool the plastic film, an inkjet printer that performs the multi-color printing may be heated by the heat of the plastic film and accordingly show low printing accuracy.

It is an object of the present disclosure to provide a technique that is able to adequately cool a continuous base material before inkjet printing while efficiently drying a pre-processing liquid applied to the continuous base material.

Solution to Problem

The present disclosure is intended for a printer for performing printing on a continuous base material that is transported from upstream to downstream. The printer includes a pre-processor that supplies a pre-processing liquid to a first surface of the continuous base material, a dryer that is located downstream of the pre-processor and dries the pre-processing liquid supplied from the preprocessor to the continuous base material, and a printing unit that is located downstream of the dryer and performs inkjet printing on the first surface of the continuous base material. The dryer includes a heating roller having a first outer peripheral surface around which the continuous base material is wound, the heating roller heating the continuous base material with the first outer peripheral surface being in contact with a second surface of the continuous base material on a side opposite to the first surface, and a cooling roller located downstream of the heating roller and having a second outer peripheral surface around which the continuous base material is wound, the second outer peripheral surface having a temperature lower than a temperature of the first outer peripheral surface.

This printer can efficiently heat the continuous base material by transporting the continuous base material wound around the heating roller. This improves the efficiency of drying the pre-processing liquid. The printer can also efficiently cool the continuous base material by cooling the continuous base material with the cooling roller.

Preferably, the continuous base material is not in contact with the first surface during transport from the preprocessor to the printing unit.

The printer can reduce the occurrence of a distortion of an image formed by the pre-processing liquid even if the pre-processing liquid applied to the first surface is semi-dried, because the first surface of the continuous base material is not in contact with the printer during transport.

Preferably, the dryer further includes an inverting transporter that is located downstream of the heating roller and shifts a position of the continuous base material in a width direction while inverting a travel direction of the continuous base material, the width direction intersecting with the travel direction.

The printer can shift the travel direction of the continuous base material while inverting it after the continuous base material has passed through the heating roller.

Preferably, the inverting transporter is located upstream of the cooling roller.

The printer can achieve the effect of being able to shift the position of the cooling roller in the width direction.

Preferably, the cooling roller is located adjacent to the heating roller in the width direction intersecting with the travel direction of the continuous base material.

Preferably, the heating roller and the cooling roller have a common rotating shaft.

The printer can use a common rotational drive mechanism for the heating roller and the cooling roller by allowing the heating roller and the cooling roller to use a common rotating shaft. This results in a reduction in device size.

Preferably, the dryer further includes a heat insulating member located between the first outer peripheral surface of the heating roller and the second outer peripheral surface of the cooling roller.

The printer uses the heat insulating member to maintain a temperature difference between the first outer peripheral surface of the heating roller and the second outer peripheral surface of the cooling roller.

Preferably, the dryer further includes a heater that heats a portion of the continuous base material that is wound around the heating roller at a position away from the first surface of the continuous base material.

Preferably, the heater faces only the heating roller and does not face the cooling roller.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the accompanying drawings. Note that constituent elements described in the embodiments are merely examples, and the scope of the present invention is not intended to be limited to these embodiments. To facilitate understanding of the drawings, the dimensions or number of each component may be illustrated in an exaggerated or simplified way as necessary.

Figure 1:
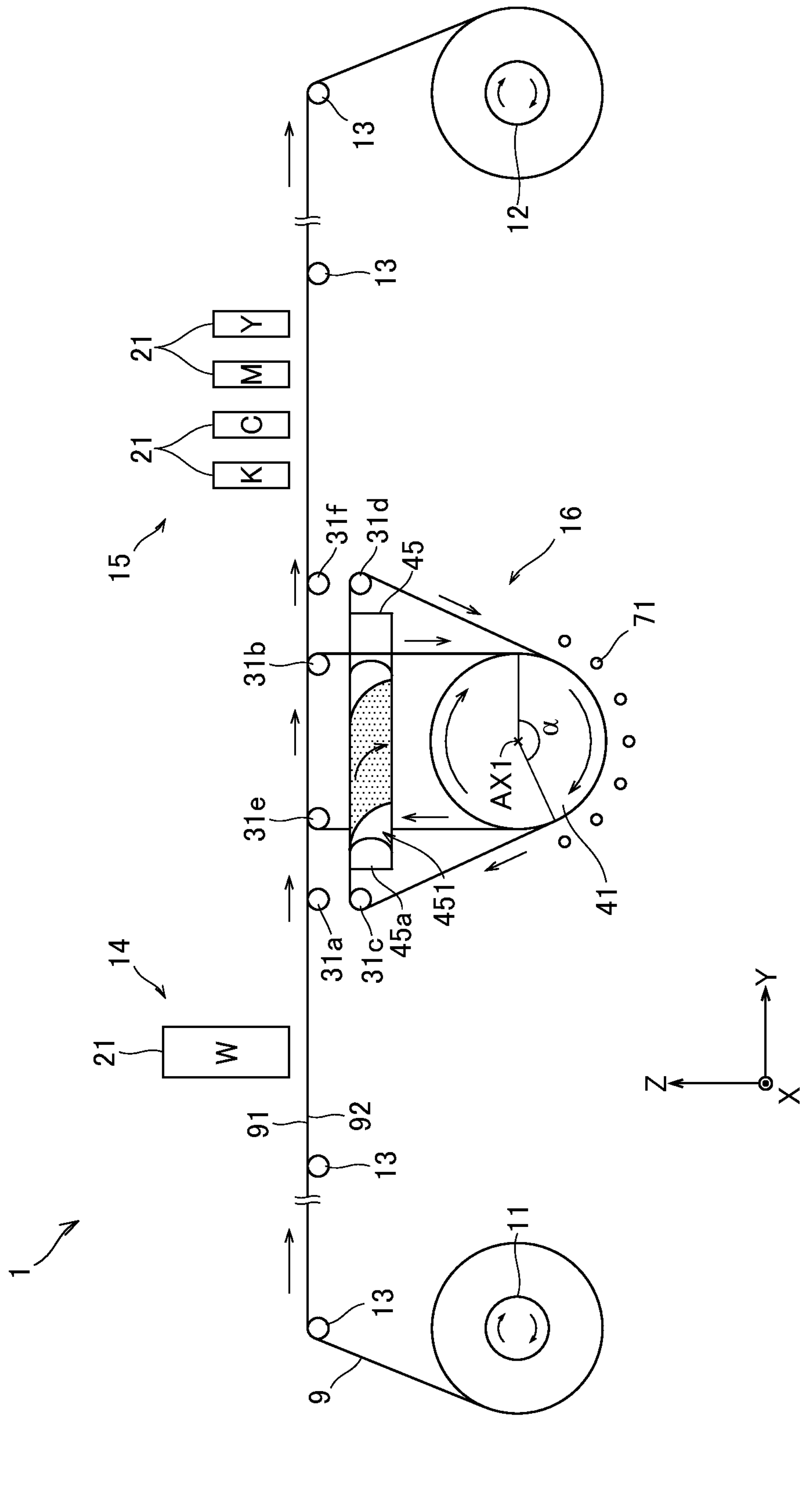
FIG. 1 is a schematic view of an inkjet printer according to a first embodiment.

In FIG. 1 and subsequent drawings, arrows are shown to indicate X, Y, and Z directions. The X, Y, and Z directions are orthogonal to one another, and may more preferably be perpendicular to one another. In the following description, the directions of the arrows are referred to as plus (+) directions, and the opposite directions thereof are referred to as minus (−) directions. The X and Y directions may preferably be horizontal directions, and the Z direction may preferably be a vertical direction. The +Z direction may preferably be a vertically upward direction, and the −Z direction may preferably be a vertically downward direction.

1. First Embodiment

FIG. 1 is a schematic view of a printer 1 according to a first embodiment. The printer 1 is a device for printing an image by ejecting ink on a first surface or printing surface 91 of a long band-like (web-like) continuous base material 9 while continuously transporting the continuous base material 9 by a roll-to-roll mechanism. The continuous base material 9 may, for example, be a resin film made of oriented polypropylene (OPP) or polyethylene terephthalate (PET) and having flexibility. Alternatively, the continuous base material 9 may be any other material such as paper or metal foil.

As shown in FIG. 1, the printer 1 includes a feed roller 11, a taking-up roller 12, a plurality of transport rollers 13, a first printing unit 14, a second printing unit 15, and a dryer 16.

The feed roller 11 and the taking-up roller 12 are rotatable about rotation axes parallel to the X direction. The feed roller 11 feeds out the continuous base material 9 that is wound in a roll before printing. The tip end portion of the continuous base material 9 that is fed out from the feed roller 11 is fixed to the outer peripheral surface of the taking-up roller 12. The taking-up roller 12 takes up the continuous base material 9 in a roll. The continuous base material 9 fed out from the feed roller 11 is transported along a prescribed transport path while being supported by the transport rollers 13, and collected by the taking-up roller 12. In the following description, the side closer to the feed roller 11 (supply side) is referred to as the "upstream side," and the side closer to the taking-up roller 12 (collection side) is referred to as the "downstream side."

The first printing unit 14 and the second printing unit 15 form an image by ejecting droplets of ink (ink droplets) on the first surface 91 of the continuous base material 9 transported along the transport path. The second printing unit 15 is located downstream of the first printing unit 14. As shown in FIG. 1, the second printing unit 15 is located away from the first printing unit 14 in the +Y direction.

The first printing unit 14 includes one print head 21. The second printing unit 15 includes a plurality of (in the present example, four) print heads 21. The print head 21 of the first printing unit 14 may eject and supply, for example, white (W) ink droplets. The first printing unit 14 is one example of a "pre-processor" that performs pre-processing of supplying W ink on the continuous base material 9 in order to improve shielding properties of the first surface 91 of the continuous base material 9. The W ink is one example of a "pre-processing liquid." Each print head 21 of the second printing unit 15 ejects color ink droplets different from the W ink. Examples of the color ink include black (K) ink, cyan (C) ink, magenta (M) ink, and yellow (Y) ink. The K ink, the C ink, the M ink, or the Y ink is one example of "ink." Note that the type of the liquid ejected from each print head 21 of the first printing unit 14 and the second printing unit 15 is not limited to the aforementioned ink. For example, the pre-processing liquid ejected from the print head 21 of the first printing unit 14 is not limited to the W ink. The pre-processing liquid may, for example, be the one that provides pre-processing for improving ink adhesion, ink color development, or ink absorbency of the continuous base material 9 before printing is performed by the second printing unit 15. Specifically, the pre-processing liquid may be a coating such as an anchor coat. The print heads 21 of the second printing unit 15 eject ink for forming an image on the first surface 91 that has undergone the pre-processing performed with the pre-processing liquid ejected from the first printing unit 14. The type of the ink ejected from each print head 21 of the second printing unit 15 may be specific color ink such as blue (B) ink or orange (Or) ink, instead of or in addition to any of the aforementioned ink including the K ink, the C ink, the M ink, and the Y ink.

The end of each print head 21 on the −Z side has a flat ejection surface that faces the first surface 91 of the continuous base material 9. The ejection surface of the print head 21 has a plurality of ejection nozzles (not shown) that are open to eject ink droplets of a predetermined color. The ejection nozzles are arranged at intervals in the X direction.

The dryer 16 is located downstream of the first printing unit 14 and upstream of the second printing unit 15. The dryer 16 dries the ink droplets ejected from the print head 21W of the first printing unit 14 to the continuous base material 9.

Figure 2:
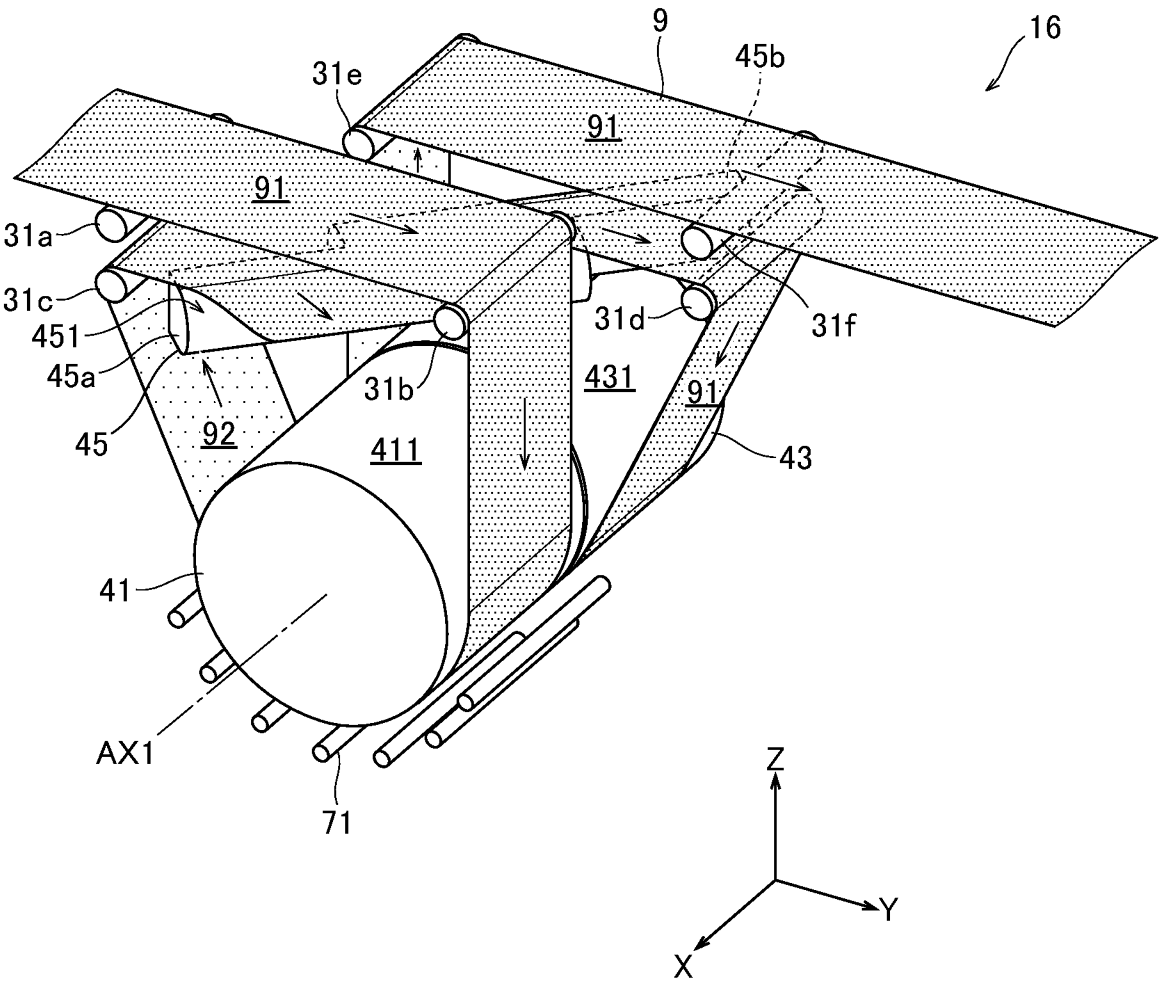
FIG. 2 is a perspective view of a dryer according to the first embodiment when viewed obliquely from the +Z side.
Figure 3:
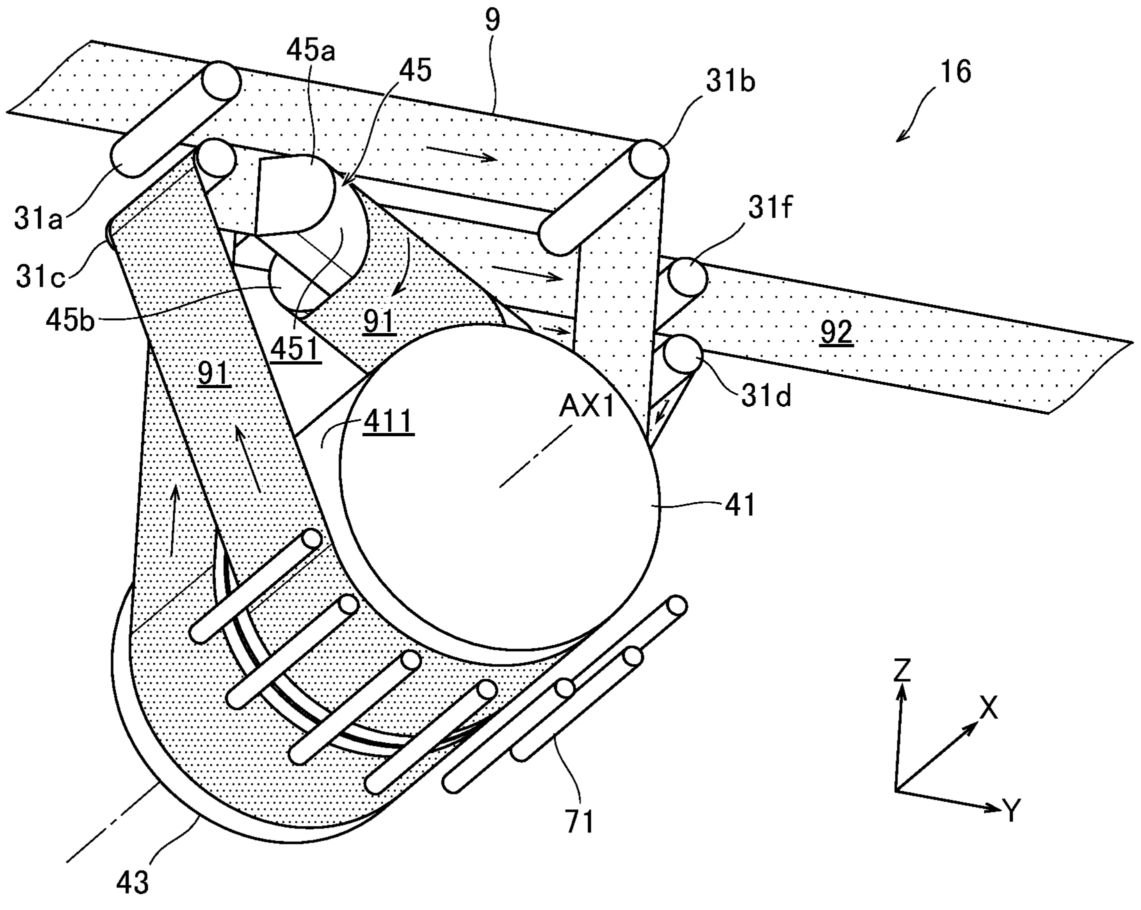
FIG. 3 is a perspective view of the dryer according to the first embodiment when viewed obliquely from the −Z side.
Figure 4:
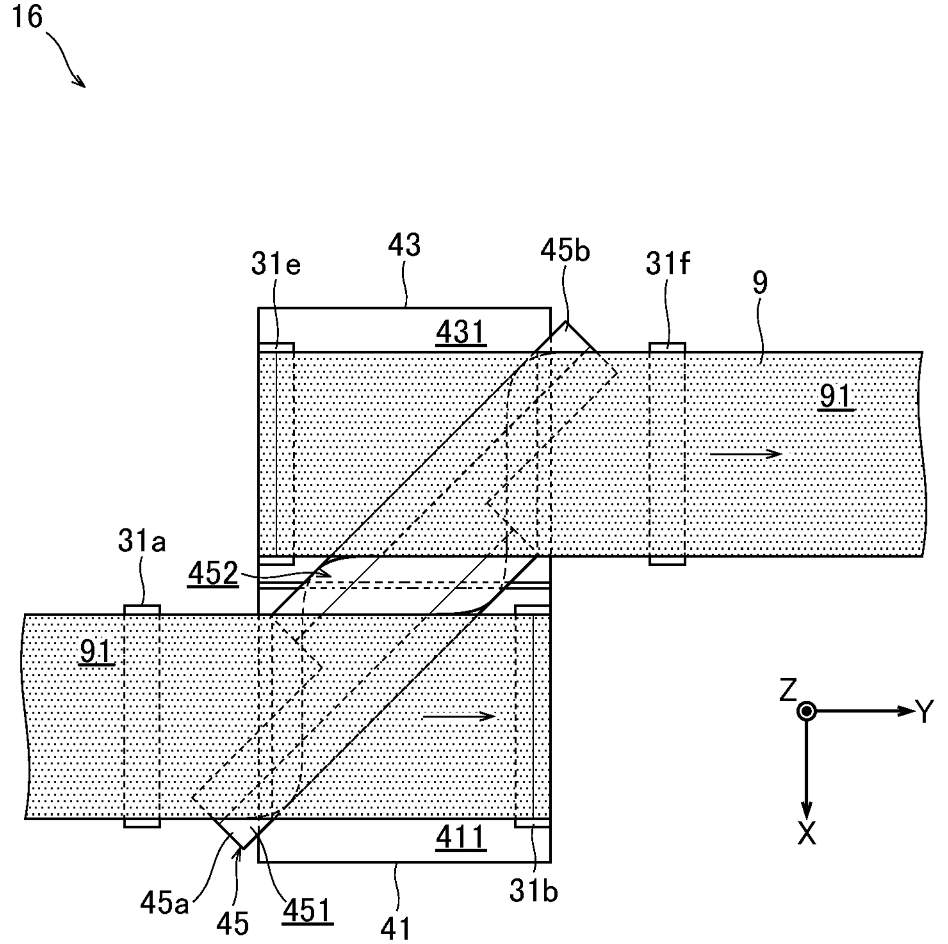
FIG. 4 is a plan view of the dryer according to the first embodiment when viewed from the +Z side.
Figure 5:
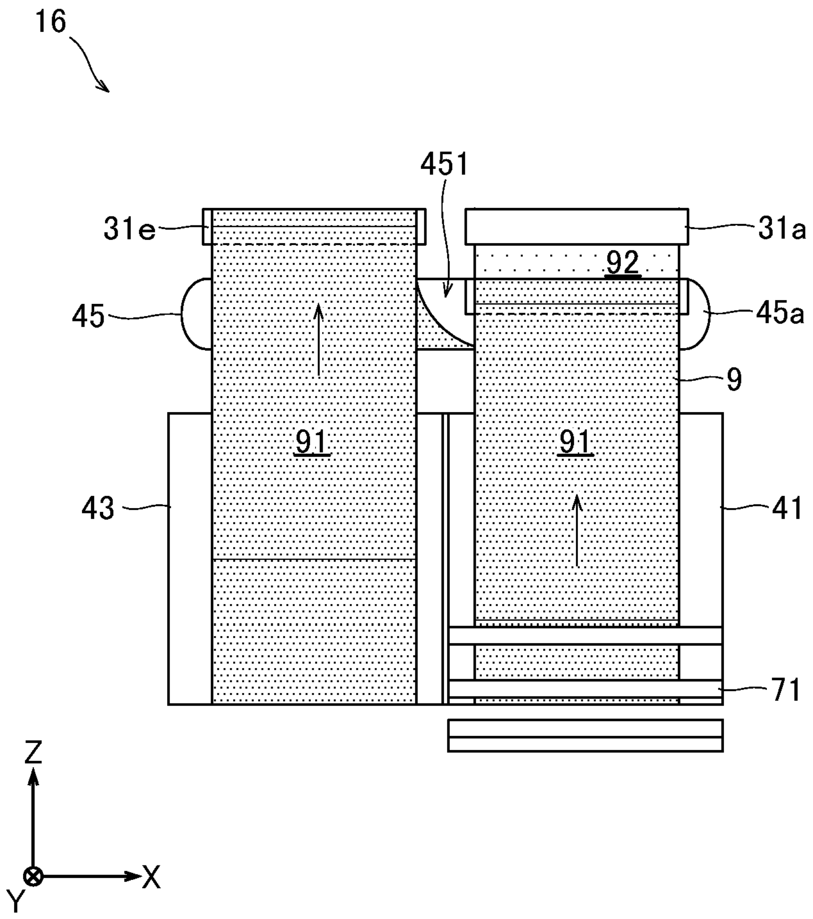
FIG. 5 is a front view of the dryer according to the first embodiment when viewed from the −Y side.

FIG. 2 is a perspective view of the dryer 16 according to the first embodiment when viewed obliquely from the +Z side. FIG. 3 is a perspective view of the dryer 16 according to the first embodiment when viewed obliquely from the −Z side. FIG. 4 is a plan view of the dryer 16 according to the first embodiment when viewed from the +Z side. FIG. 5 is a front view of the dryer 16 according to the first embodiment when viewed from the −Y side.

The dryer 16 includes a plurality of (in the present example, six) transport rollers 31*a*, 31*b*, 31*c*, 31*d*, 31*e*, and 31*f*, a heating roller 41, a cooling roller 43, an inverting transporter 45, and a heater 71.

As shown in FIGS. 1 and 2, the transport roller 31*a* is arranged downstream of the first printing unit 14. The transport roller 31*a* is arranged at the same height in the Z direction as the height in the Z direction of a transport roller 13 located immediately upstream of the first printing unit 14 in the transport direction so that the continuous base material 9 is transported below the first printing unit 14 while being held in an approximately horizontal position. The transport roller 31*b* is located way from the transport roller 31*a* in the +Y direction. The transport roller 31*b* is arranged at the same position as the transport roller 31*a* in the Z direction.

The transport roller 31*c* is arranged at the same position as the transport roller 31*a* in the X and Y directions. The transport roller 31*c* is located away from the transport roller 31*a* in the −Z direction. The transport roller 31*d* is located away from the transport roller 31*c* in the −X and +Y directions. The transport roller 31*d* is arranged at the same position as the transport roller 31*c* in the Z direction.

The transport roller 31*e* is located away from the transport roller 31*d* in the −Y direction. The transport roller 31*e* is arranged at the same position as the transport roller 31*d* in the X direction. The transport roller 31*e* is arranged at the same position as the transport roller 31*a* in the Z direction.

The transport roller 31*f* is located away from the transport roller 31*e* in the +Y direction. The transport roller 31*f* is arranged at the same position as the transport roller 31*e* in the X and Z directions.

The heating roller 41 and the cooling roller 43 are rotatable about a rotation axis AX1 extending in the X direction. The heating roller 41 has a first outer peripheral surface 411 around which the continuous base material 9 is wound. The first outer peripheral surface 411 comes in contact with a second surface 92 of the continuous base material 9 on the side opposite to the first surface 91 and heats the continuous base material 9 from the side of the second surface 92. The temperature at the first outer peripheral surface 411 of the heating roller 41 is set to be lower than the heat-proof temperature of the continuous base material 9. For example, in the case where the continuous base material 9 has a heat-proof temperature of 110 to 140° C., the first outer peripheral surface 411 is heated to a temperature of 60 to 90° C.

The cooling roller 43 has a second outer peripheral surface 431 around which the continuous base material 9 is wound. The temperature at the second outer peripheral surface 431 is lower than the temperature at the first outer peripheral surface 411 of the heating roller 41 (e.g., 15 to 30° C. and preferably 20° C.). The second outer peripheral surface 431 of the cooling roller 43 comes in contact with the second surface 92 of the continuous base material 9 and cools a portion of the continuous base material 9 that is heated by the heating roller 41.

The heating roller 41 is located downstream of the transport roller 31*b* and upstream of the transport roller 31*c*. The heating roller 41 is located away from the transport roller 31*c* on the +Y and −Z sides. The cooling roller 43 is located downstream of the transport roller 31*d* and upstream of the transport roller 31*e*. The cooling roller 43 is located away from the transport roller 31*d* on the −Y and −Z sides.

As shown in FIG. 1, the continuous base material 9 is wound around the heating roller 41 at a predetermined holding angle α. The holding angle α refers to the angle formed by lines that connect the center of rotation of the heating roller 41 (rotation axis AX1) and each of the upstream and downstream ends of the continuous base material 9 that are in contact with the heating roller 41 in side view from the X direction. Preferably, the holding angle α may be greater than or equal to 90 degrees. The holding angle of the cooling roller 43 is the same as the holding angle α. Alternatively, the holding angle of the cooling roller 43 may differ from the holding angle α.

As shown in FIGS. 1 to 3, the travel direction of the continuous base material 9 is changed from the +Y direction to the −Z direction by the transport roller 31*b*. Then, the continuous base material 9 is wound around the heating roller 41, so that the travel direction of the continuous base material 9 is changed to the +Z and −Y directions. The travel direction of the continuous base material 9 is further changed to the +Y direction by the transport roller 31*c*.

The travel direction of the continuous base material 9 is also changed from the +Y direction to the −Z and −Y directions by the transport roller 31*d*. Then, the continuous base material 9 is wound around the cooling roller 43, so that the travel direction of the continuous base material 9 is changed from the −Z direction to the +Z direction. The travel direction of the continuous base material 9 is further changed from the +Z direction to the +Y direction by the transport roller 31*e*.

Figure 6:
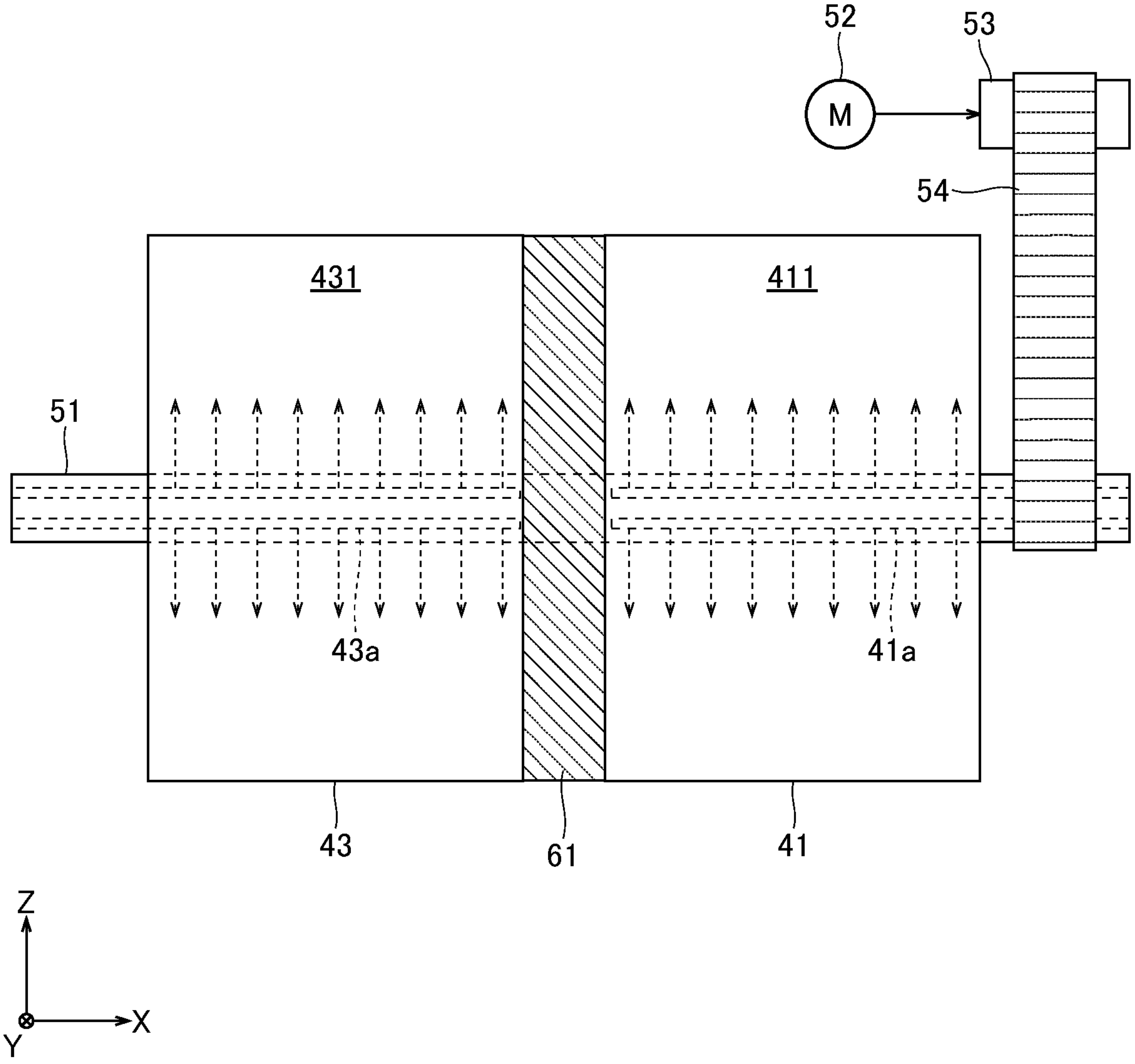
FIG. 6 is a diagram showing a heating roller and a cooling roller according to the first embodiment.

FIG. 6 is a diagram showing the heating roller 41 and the cooling roller 43 according to the first embodiment. As shown in FIG. 6, the heating roller 41 and the cooling roller 43 are connected to a common rotating shaft 51 that extends in parallel with the X direction. That is, in the present example, the heating roller 41 and the cooling roller 43 have a common shaft (shaft center) serving as the center of rotation. In other words, the heating roller 41 and the cooling roller 43 are placed along the common shaft center.

As indicated by virtual lines in FIG. 6, the rotating shaft 51 includes therein piping 41*a* for supplying a liquid to heat the heating roller 41 and piping 43*a* for supplying a liquid to cool the cooling roller 43. A high-temperature liquid is supplied from the piping 41*a* toward the inner surface of a tubular portion of the heating roller 41, and a low-temperature liquid is supplied from the piping 43*a* toward the inner surface of a tubular portion of the cooling roller 43. Although not shown, the heating roller 41 includes therein piping for discharging the high-temperature liquid to the outside, and the cooling roller 43 includes therein piping for discharging the low-temperature liquid to the outside.

The dryer 16 includes a drive motor 52, a drive shaft 53, and an endless belt 54. The endless belt 54 runs between the rotating shaft 51 and the drive shaft 53. When the drive motor 52 rotates the drive shaft 53, the rotating shaft 51 rotates via the endless belt 54, and the heating roller 41 and the cooling roller 43 are integrally rotated. That is, the heating roller 41 and the cooling roller 43 rotate at the same rotation speed.

Since the heating roller 41 and the cooling roller 43 share the shaft, these rollers can be rotated by one drive mechanism. This results in a reduction in device size. It is, however, noted that the use of a common shaft is not an absolute necessity for the heating roller 41 and the cooling roller 43. In such a case, the heating roller 41 and the cooling roller 43 each may have an own rotation drive mechanism. The cooling roller 43 is arranged at the same position as the heating roller 41 in the Y and Z directions. However, the cooling roller 43 may be located away from the heating roller 41 in the Y or Z direction.

As shown in FIG. 6, the dryer 16 includes a heat insulating member 61. The heat insulating member 61 is inserted between the heating roller 41 and the cooling roller 43. That is, the heat insulating member 61 is located between the first outer peripheral surface 411 of the heating roller 41 and the second outer peripheral surface 431 of the cooling roller 43.

The presence of the heat insulating member 61 maintains a temperature difference between the first outer peripheral surface 411 of the heating roller 41 and the second outer peripheral surface 431 of the cooling roller 43.

The inverting transporter 45 shifts the position of the continuous base material 9 in a width direction that intersects with the travel direction while inverting the travel direction of the continuous base material 9. As shown in FIGS. 1 to 5, the inverting transporter 45 is located downstream of the transport roller 31*c* and upstream of the transport roller 31*d*.

As shown in FIGS. 2 to 4, the inverting transporter 45 includes two turn bars 45*a* and 45*b*. The turn bar 45*a* has a winding surface 451, and the turn bar 45*b* has a winding surface 452. The winding surfaces 451 and 452 are surfaces that have semi-circular shapes in section and around which the second surface 92 of the continuous base material 9 are wound. The winding surfaces 451 and 452 extend in a direction parallel to an XY plane that is parallel to the X and Y directions.

The winding surface 452 is located downstream of the winding surface 451 in the transport path. The winding surface 452 is located while being shifted in the −X and +Y directions with respect to the winding surface 451. The winding surface 452 overlaps in part with the winding surface 451 in the X direction. The winding surfaces 451 and 452 are inclined in the −Y direction to the +X direction. In the present example, the winding surfaces 451 and 452 extend in directions that are each inclined 45 degrees to the X and Y directions (see FIG. 4). The winding surfaces 451 and 452 face in opposite directions. In the present example, the winding surface 451 faces in the +X and +Y directions, and the winding surface 452 faces in the −X and −Y directions.

The continuous base material 9 is wound around the winding surface 451 of the turn bar 45*a* and then wound around the winding surface 452 of the turn bar 45*b*. When the continuous base material 9 is wound around the winding surface 451, the travel direction of the continuous base material 9 is inverted from the +Y direction to the −Y direction and bends 45 degrees in the −X direction. When the continuous base material 9 is wound around the winding surface 452, the travel direction of the continuous base material 9 is inverted from the −Y direction to the +Y direction and bends 45 degrees in the +X direction. These two turns change the travel direction of the continuous base material 9 into the +Y direction and shifts the position of the continuous base material 9 in the −X direction.

Note that the winding surfaces 451 and 452 of the turn bars 45*a* and 45*b* each may include a plurality of air outlets (not shown) from which air is ejected. The ejection of air from the air outlets prevents the continuous base material 9 from coming in contact with the winding surfaces 451 and 452. This reduces friction between the continuous base material 9 and the winding surfaces 451 and 452 and accordingly allows the travel direction of the continuous base material 9 to be inverted adequately while avoiding misregistration of the continuous base material 9.

The turn bars 45*a* and 45*b* of the inverting transporter 45 are nonrotating bars. It is, however, noted that the inverting transporter 45 may include rotatable rollers, instead of the turn bars 45*a* and 45*b*.

The inverting transporter 45 is arranged between the heating roller 41 and the cooling roller 43 in the transport path of the continuous base material 9. It is, however, noted that the inverting transporter 45 may be arranged upstream of the heating roller 41 or downstream of the cooling roller 43. In this case, the cooling roller 43 may be arranged at the same position as the heating roller 41 in the X direction.

The heater 71 faces the portion of the continuous base material 9 that is wound around the first outer peripheral surface 411 of the heating roller 41 and heats the continuous base material 9 from a position away from the first surface 91 of the continuous base material 9. For example, the heater 71 may be an infrared (IR) heater. Note that the heater 71 may be configured to supply hot air to the first surface 91 of the continuous base material 9.

The heater 71 faces only the heating roller 41 and does not face the cooling roller 43. Thus, the heater 71 is capable of heating only the portion of the continuous base material 9 that is wound around the heating roller 41.

The foregoing has been description of a main configuration of the printer 1. In the printer 1, first, a W ink image is formed on the first surface 91 of the continuous base material 9 by the print head 21W of the first printing unit 14. When the portion on which the W ink image has been formed (hereinafter, referred to as a "to-be-printed portion") is transported to the drier 16, the to-be-printed portion comes in contact with the heating roller 41 and is heated from the side of the second surface 92 of the continuous base material 9. Accordingly, drying of the W ink proceeds. The continuous base material 9 is also heated from the side of the first surface 91 by the heater 71. This accelerates the drying of the W ink on the to-be-printed portion. Then, the continuous base material 9 is transported, so that the to-be-printed portion moves away from the heating roller 41 and comes into contact with the cooling roller 43 via the inverting transporter 45. The to-be-printed portion is then cooled, and the temperature of the to-be-printed portion is lowered. The to-be-printed portion is further transported to the second printing unit 15, so that a color ink image is formed immediately on the W ink image on the to-be-printed portion by each print head 21 of the second printing unit 15.

As shown in FIGS. 2 to 5, the transport rollers 31*a* to 31*f*, the heating roller 41, the cooling roller 43, and the inverting transporter 45 are all arranged on the side of the second surface 92 of the continuous base material 9, and neither of them come in contact with the first surface 91 of the continuous base material 9. Thus, the dryer 16 transports the continuous base material 9 without contact with the first surface 91 of the continuous base material 9. That is, as shown in FIG. 1, the continuous base material 9 are not in contact with the first surface 91 during transport from the first printing unit 14 to the second printing unit 15.

For example, when color ink is printed on the W ink, it may be preferable in some cases and depending on the ink type that the W ink is semi-dried. In this case, the W ink image formed on the first surface 91 of the continuous base material 9 by the first printing unit 14 may be transported to the second printing unit 15 without being completely dried by the dryer 16. Since the continuous base material 9 is not in contact with the first surface 91 during transport up to the second printing unit 15, even if the W ink image is semi-dried, it is possible to reduce the occurrence of a distortion of the W ink image before the continuous base material 9 reaches the second printing unit 15.

Advantageous Effects

In the printer 1, the continuous base material 9 comes in surface contact with the heating roller 41 when the continuous base material 9 is wounded around the heating roller 41. This improves the efficiency of heating the continuous base material 9 and accordingly improves the efficiency of drying the ink (W ink) on the continuous base material 9.

Moreover, the continuous base material 9 comes in surface contact with the cooling roller 43 when the continuous base material 9 is wound around the cooling roller 43. This improves the efficiency of cooling the continuous base material 9. This allows the continuous base material 9 to be adequately cooled before moving to the second printing unit 15. Accordingly, it is possible to reduce the possibility that each print head 21 of the second printing unit 15 will be heated by the heat of the continuous base material 9 (heat transfer). As an additional remark, it is noted that the continuous base material 9 is transported in close proximity to the ink ejection surface of the second printing unit 15. Therefore, if the continuous base material 9 remains at a high temperature until transported to the second printing unit 15, the nozzles of the second printing unit 15 may be dried due to the heat generated by the continuous base material 9 and this may cause problems such as a shift in the flying direction of the ink ejected from the nozzles. According to the present embodiment, the continuous base material 9 that has been adequately cooled is transported to the second printing unit 15, and therefore it is possible to suppress a reduction in the printing accuracy of the second printing unit 15.

2. Second Embodiment

Next, a second embodiment will be described. In the following description, elements whose functions are similar to the functions of already-described elements are given the same reference numerals or reference numerals with alphabetic characters added thereto, and detailed description thereof shall be omitted.

Figure 7:
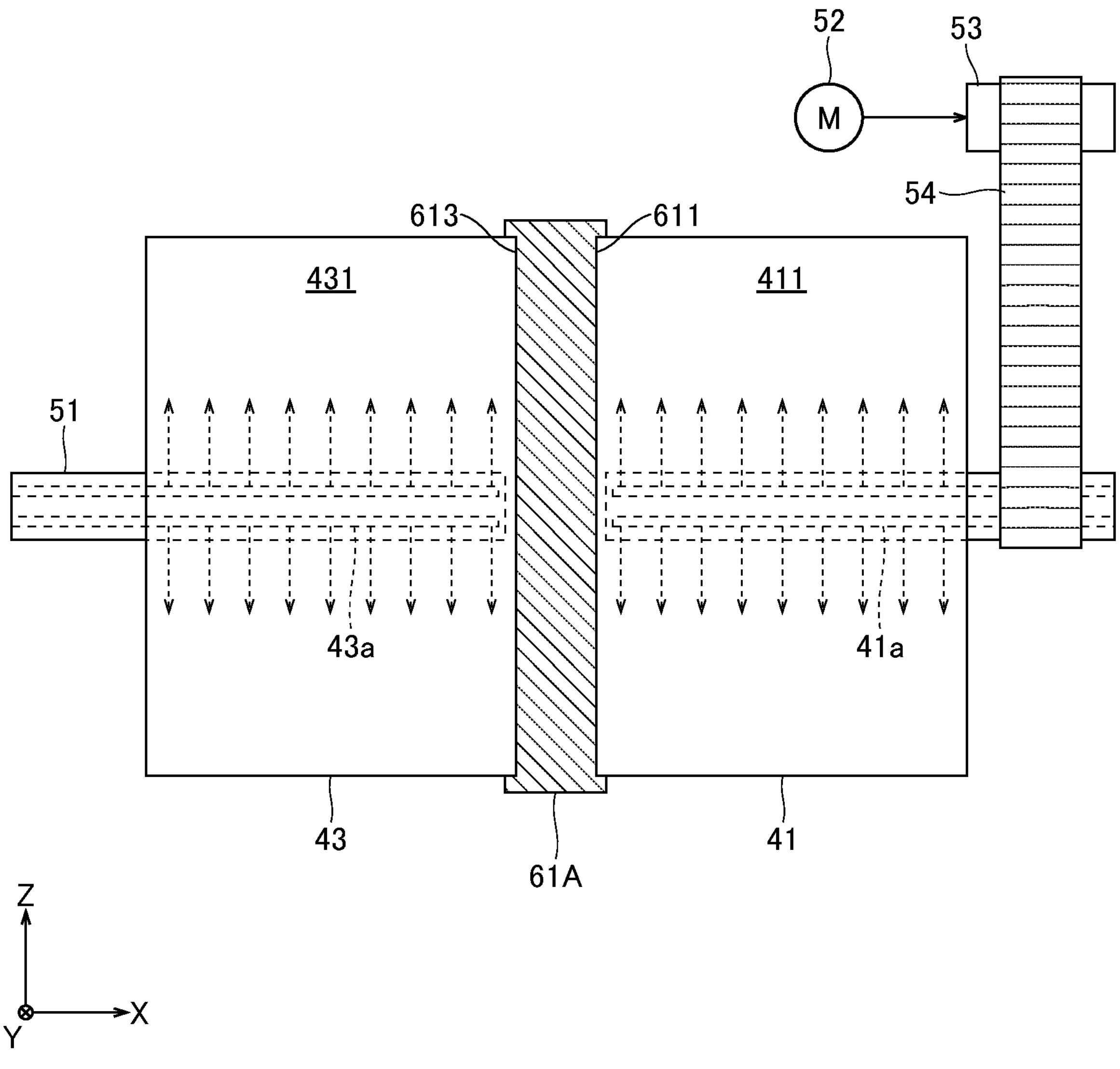
FIG. 7 is a diagram showing a heating roller and a cooling roller according to a second embodiment.

FIG. 7 is a diagram showing the heating roller 41 and the cooling roller 43 according to the second embodiment. In the example illustrated in FIG. 7, a heat insulating member 61A has an outside shape greater than the outside shapes of the heating roller 41 and the cooling roller 43 in the Z direction. The side faces on the +X and −X sides of the heat insulating member 61A respectively have recessed portions 611 and 613 that are recessed in the X direction. The heating roller 41 and the cooling roller 43 are respectively fitted in the recessed portions 611 and 613. That is, the heating roller 41 and the cooling roller 43 are integrated together by the heat insulating member 61A. The rotating shaft 51 of the heating roller 41 and the rotating shaft 51 of the cooling roller 43 are also integrated together by the heat insulating member 61A. Accordingly, the heating roller 41 and the cooling roller 43 in the example shown in FIG. 7 also have a common shaft center.

Even in the case of employing the heat insulating member 61A, it is possible to adequately maintain the temperature difference between the first outer peripheral surface 411 and the second outer peripheral surface 431, as in the same case of employing the heat insulating member 61 shown in FIG. 6. The heating roller 41 and the cooling roller 43 also have a common shaft center.

3. Third Embodiment

Figure 8:
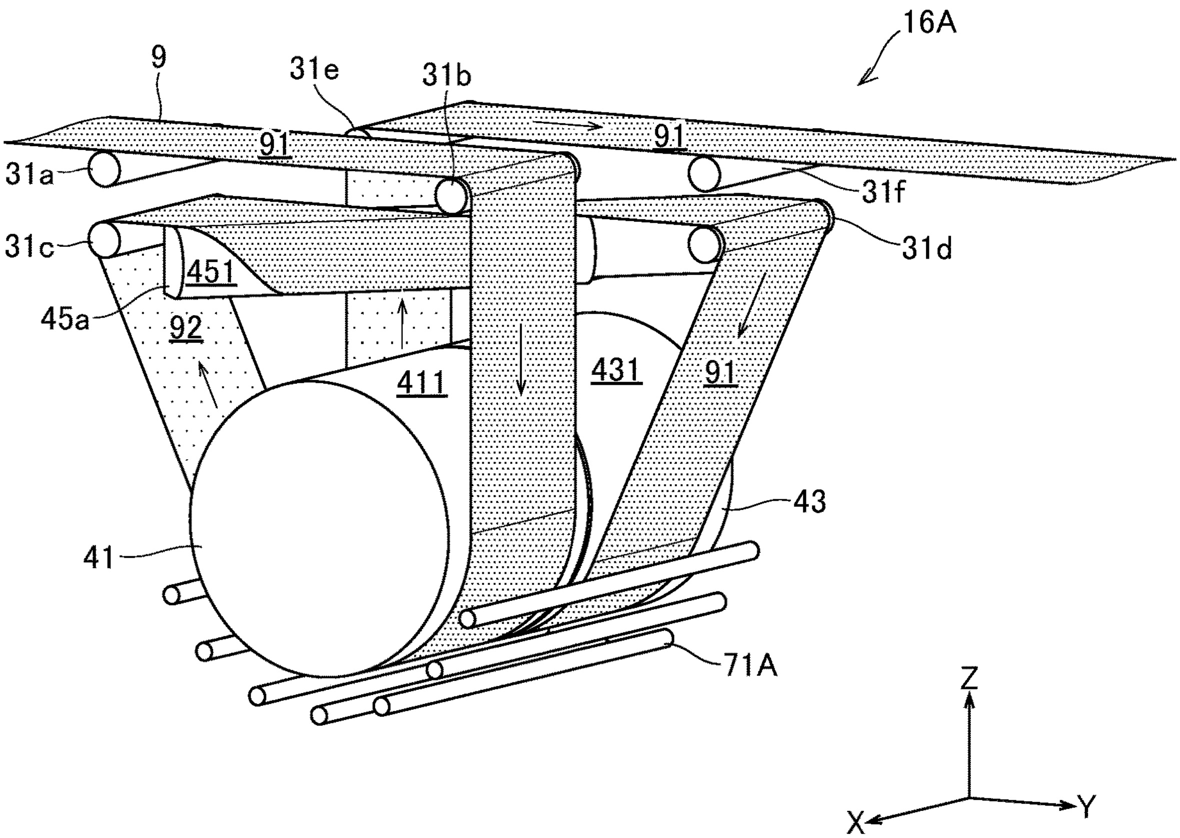
FIG. 8 is a perspective view of an inkjet printer according to a third embodiment.

FIG. 8 is a perspective view of a dryer 16A according to a third embodiment. As shown in FIG. 8, the dryer 16A according to the third embodiment includes a heater 71A, instead of the heater 71. The heater 71A extends in the X direction and faces not only the heating roller 41 but also the cooling roller 43. Thus, the heater 71 is also capable of heating a portion of the continuous base material 9 that is wound around the cooling roller 43. Accordingly, it is possible to dry the ink (W ink) on the first surface 91 of the continuous base material 9 while cooling the continuous base material 9 with the cooling roller 43.

4. Variations

While the above has been description of some embodiments, the above-described embodiments may be modified in various ways. For example, although the first printing unit 14 according to the above-described embodiments is configured as an inkjet printer for ejecting ink droplets, the first printing unit 14 may be configured as a rotogravure roll coater that applies a pre-processing liquid such as W ink to the continuous base material 9.

While the invention has been shown and described in detail, the foregoing description is in all aspects illustrative and not restrictive. It is therefore understood that numerous modifications and variations can be devised without departing from the scope of the invention.

What is claimed is:

1. A printer for performing printing on a continuous base material that is transported from upstream to downstream, the printer comprising:

a pre-processor that supplies a pre-processing liquid to a first surface of the continuous base material;

a dryer that is located downstream of the pre-processor and dries the pre-processing liquid supplied from the preprocessor to the continuous base material; and a printing unit that is located downstream of the dryer and performs inkjet printing on the first surface of the continuous base material;

wherein the dryer includes:

a heating roller having a first outer peripheral surface around which the continuous base material is wound, the heating roller heating the continuous base material with the first outer peripheral surface being in contact with a second surface of the continuous base material on a side opposite to the first surface; and a cooling roller located downstream of the heating roller and having a second outer peripheral surface around which the continuous base material is wound, the second outer peripheral surface having a temperature lower than a temperature of the first outer peripheral surface.

2. The printer according to claim 1, wherein the continuous base material is not in contact with the first surface during transport from the preprocessor to the printing unit.

3. The printer according to claim 1, wherein the dryer further includes:

an inverting transporter that is located downstream of the heating roller and shifts a position of the continuous base material in a width direction while inverting a travel direction of the continuous base material, the width direction intersecting with the travel direction.

4. The printer according to claim 3, wherein the inverting transporter is located upstream of the cooling roller.

5. The printer according to claim 3, wherein the cooling roller is located adjacent to the heating roller in the width direction intersecting with the travel direction of the continuous base material.

6. The printer according to claim 5, wherein the heating roller and the cooling roller have a common rotating shaft.

7. The printer according to claim 5, wherein the dryer further includes:

a heat insulating member located between the first outer peripheral surface of the heating roller and the second outer peripheral surface of the cooling roller.

8. The printer according to claim 1, wherein the dryer further includes:

a heater that heats a portion of the continuous base material that is wound around the heating roller at a position away from the first surface of the continuous base material.

9. The printer according to claim 8, wherein the heater faces only the heating roller and does not face the cooling roller.

* * * * *